(12) United States Patent
van Nieuwstadt

(10) Patent No.: US 6,947,831 B2
(45) Date of Patent: Sep. 20, 2005

(54) PRESSURE SENSOR DIAGNOSIS VIA A COMPUTER

(75) Inventor: Michiel J. van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/411,673

(22) Filed: Apr. 11, 2003

(65) Prior Publication Data
US 2004/0200271 A1 Oct. 14, 2004

(51) Int. Cl.⁷ .............................................. G06F 19/00
(52) U.S. Cl. ...................... 701/114; 701/115; 701/102; 123/557; 123/193.6; 123/640; 123/525; 60/277; 60/278; 73/117.3; 73/118.1
(58) Field of Search ................................ 701/114, 115, 701/102; 123/557, 193.6, 640, 525; 60/277, 278; 73/117.3, 118.1

(56) References Cited

U.S. PATENT DOCUMENTS

| | | |
|---|---|---|
| 5,505,179 A | 4/1996 | Brennan |
| 5,983,714 A | 11/1999 | Izumiura et al. |
| 6,233,927 B1 * | 5/2001 | Hirota et al. ................... 60/297 |
| 6,234,148 B1 | 5/2001 | Hartke et al. |
| 6,474,306 B2 | 11/2002 | Muller et al. |
| 6,499,292 B2 | 12/2002 | Kato |
| 6,651,640 B1 * | 11/2003 | Sealy et al. ................... 123/698 |
| 6,708,104 B2 * | 3/2004 | Avery et al. ................... 701/110 |
| 2002/0136936 A1 | 9/2002 | Grieve et al. |
| 2003/0019212 A1 | 1/2003 | Baeuerle et al. |
| 2003/0023367 A1 | 1/2003 | Avery, Jr. et al. |

FOREIGN PATENT DOCUMENTS

| | | |
|---|---|---|
| EP | 1 114 922 A1 | 7/2001 |
| EP | 1 231 663 A1 | 8/2002 |
| WO | WO 01/02720 A1 | 1/2001 |

* cited by examiner

*Primary Examiner*—Tony M. Argenbright
*Assistant Examiner*—Johnny H. Hoang
(74) *Attorney, Agent, or Firm*—Alleman Hall McCoy Russell & Tuttle LLP; Allen J. Lippa

(57) ABSTRACT

A method is described for controlling regeneration of a particulate filter based on at least a sensor, such as a differential pressure sensor. Degradation of the sensor is then detected in a variety of ways. One approach takes advantage of the slowly varying flow resistance of the filter compared with the more rapid variations in flow caused by changing engine conditions. Default operation is then taken when a degraded sensor is detected.

26 Claims, 10 Drawing Sheets

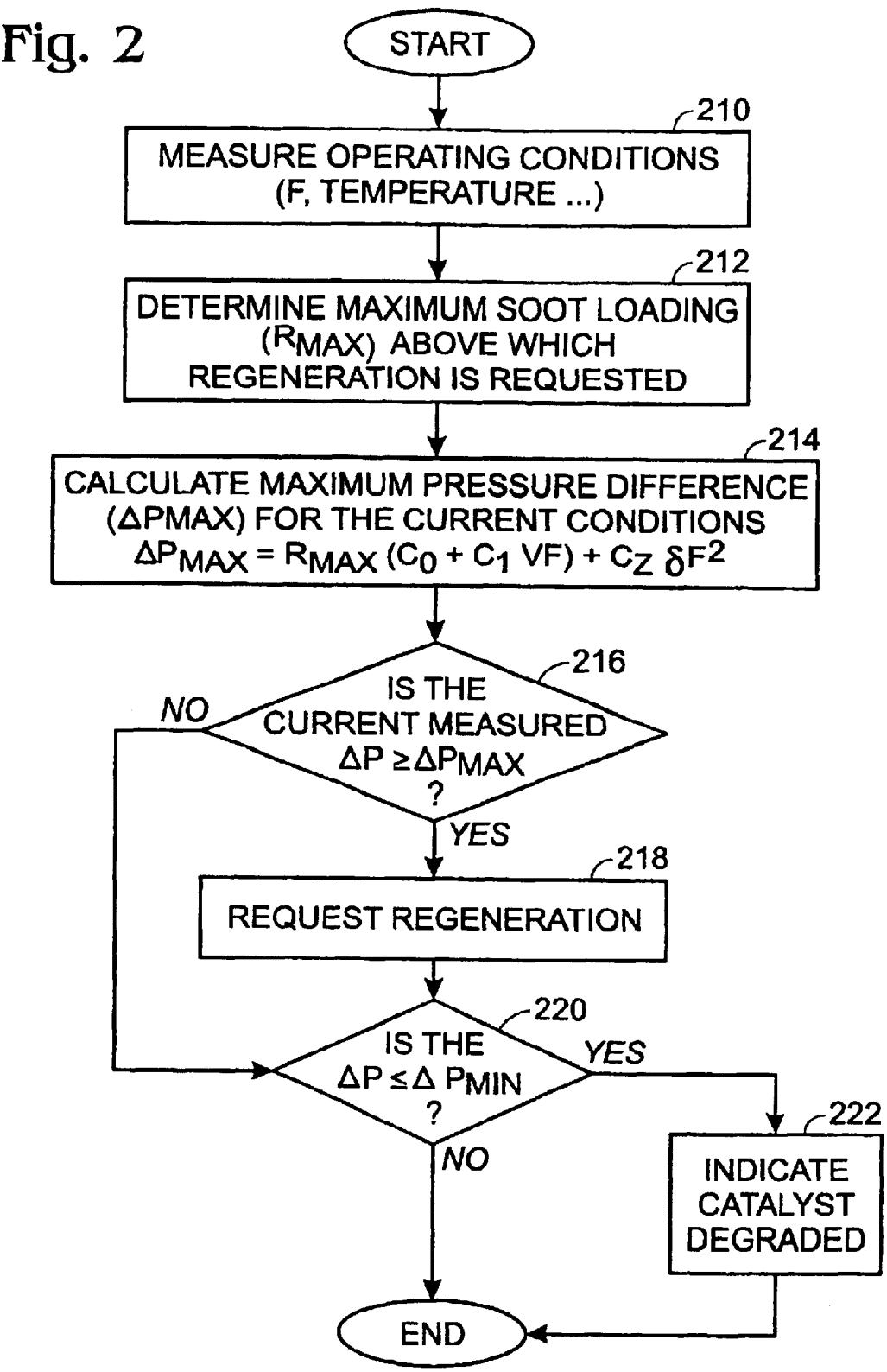

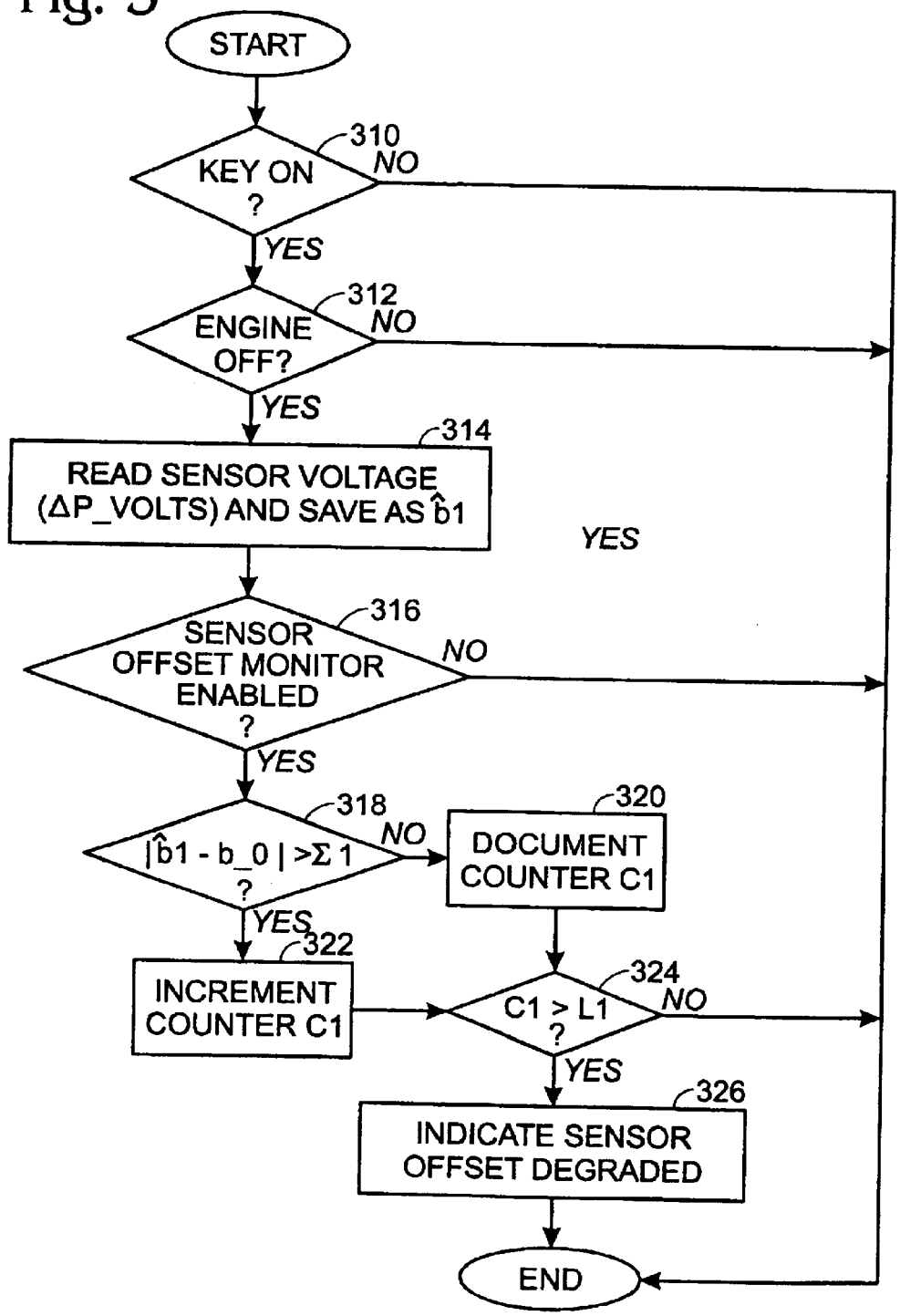

PRESSURE SENSOR DIAGNOSIS VIA A COMPUTER

BACKGROUND OF THE INVENTION

Diesel engines can use particulate filters (DPFs) to reduce soot emissions. These filters trap particulate matter that is contained in the exhaust gasses passing through the filter. Periodically, when the filters become full of soot, they are regenerated by raising exhaust gas temperature to the point where the soot is burned. In this way, the filter is again able to retain soot and overall soot emissions are reduced.

DPF regeneration can be controlled based on differential pressure measured across the filter. As more and more soot is stored, a larger differential pressure is measured. See, for example, U.S. published application Ser. No. 2002/0,136, 936. Also, degradation in the particulate filter can be determined from such a differential pressure sensor.

The inventors of the present invention have recognized a disadvantage with such systems. Specifically, if the pressure sensor is used to control regeneration is degraded, this can result in either too frequent, or too infrequent, DPF regeneration. Too frequent regeneration (from an erroneously high reading) can result in decreased fuel economy as energy is needlessly spent raising exhaust gas temperatures. Likewise, too infrequent regeneration (from an erroneously low reading) can result in impaired driveability. Further, a degraded sensor output can result in erroneous determinations that the DPF itself has become degraded, thereby resulting in replacement filter costs when no filter replacement may be required.

SUMMARY OF ASPECTS OF THE INVENTION

In one aspect of the invention, the above disadvantages are overcome by a system for a vehicle having an engine with an exhaust system, the system comprising:
  a pressure sensor coupled in the engine exhaust;
  a particulate filter coupled in the engine exhaust; and
  a computer storage medium having a computer program encoded therein for determining degradation of said exhaust pressure sensor, comprising:
    code for determining an expected sensor response;
    code for measuring a signal response from the exhaust pressure sensor during at least a selected engine operating condition; and
    code for determining degradation of the exhaust pressure sensor based at least on said expected sensor response and said signal response.

In this way, it is possible to reduce operation with a degraded pressure sensor causing too frequent, or too infrequent, DPF regeneration.

In another aspect of the invention, the above disadvantages are overcome by a system for a vehicle having an engine with an exhaust system, the system comprising:
  a pressure sensor coupled in the engine exhaust;
  a particulate filter coupled in the engine exhaust; and
  a computer storage medium having a computer program encoded therein for determining degradation of said exhaust pressure sensor, comprising:
    code for determining at least a parameter based on at least two flow conditions;
    code for measuring a signal from the exhaust pressure sensor; and
    code for determining degradation of the exhaust pressure sensor based at least on said parameter and said signal.

By monitoring the pressure sensor across flow conditions, it is possible to utilize the knowledge that soot buildup is a relatively slow process. Therefore, it is possible to coordinate expected pressure changes due to flow variation with actual readings in order to determine degradation of the sensor. For example, in one example, an estimate of the sensor characteristics is estimated from pressure sensor responses to variations in flow (during conditions where soot buildup is relatively unchanged). Then, this estimated sensor characteristic can be compared to an expected sensor characteristic to detect sensor degradation. In this way, too frequent, or too infrequent, regeneration is reduced.

In yet another aspect of the invention, the above disadvantages are overcome by a system for a vehicle having an engine with an exhaust system, the system comprising:
  a particulate filter coupled in the engine exhaust;
  a sensor coupled in the engine exhaust; and
  a computer storage medium having a computer program encoded therein, comprising:
    code for regenerating said particulate filter based on said sensor; and
    code for determining degradation of said sensor based on an operating parameter.

Note that various types of sensors could be used in the exhaust, such as, for example: pressure sensor, a differential pressure sensor, absolute pressure sensor, mass air flow sensor, air-fuel sensor, temperature sensor, or various others.

Thus, according to the present invention, it is possible to monitor a sensor whose degradation may result in an increase in emissions above an applicable governmental regulation.

BRIEF DESCRIPTION OF THE DRAWINGS

The advantages described herein will be more fully understood by reading examples of an embodiments in which the invention is used to advantage, with reference to the drawings, wherein:

FIGS. 2–4 describe control routines according to aspects of the invention;

DESCRIPTION OF EMBODIMENT(S)

Figure 1A:
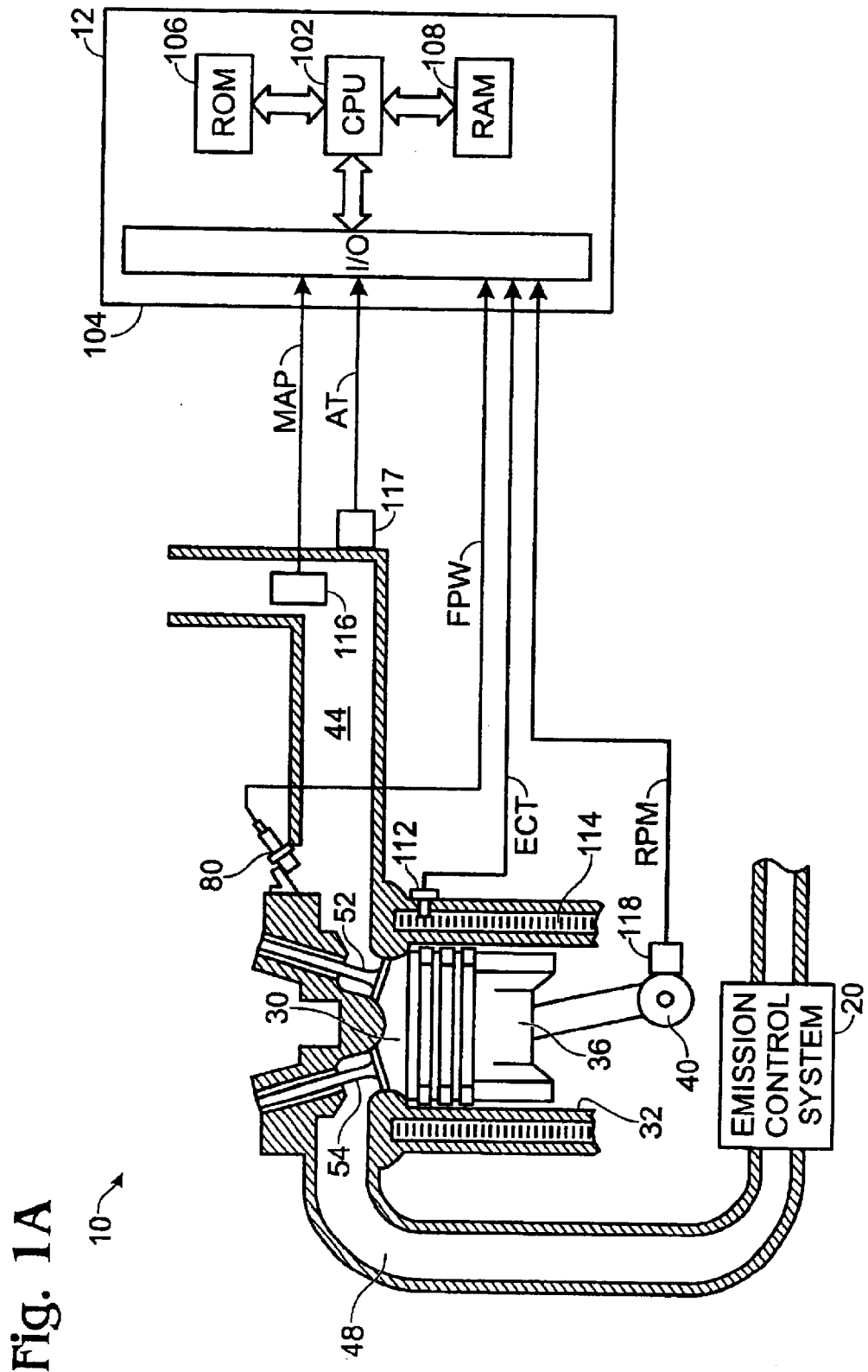
FIGS. 1A and 1B are schematic diagrams of an engine wherein the invention is used to advantage.

Internal combustion engine 10, comprising a plurality of cylinders, one cylinder of which is shown in FIG. 1A, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is also shown having fuel injector 80 coupled thereto for delivering liquid fuel in proportion to the pulse width of signal FPW from controller 12. Both fuel quantity, controlled by signal FPW and injection timing are adjustable. Fuel is delivered to fuel injector 80 by a fuel system (not shown), including a fuel tank, fuel pump, and fuel rail. Compression ignition combustion is primarily utilized in engine 10.

Controller 12 is shown in FIG. 1A as a conventional microcomputer including: microprocessor unit 102, input/output ports 104, read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold pressure (MAP) from pressure sensor 116 coupled to intake manifold 44; a measurement (AT) of manifold temperature from temperature sensor 117; an engine speed signal (RPM) from engine speed sensor 118 coupled to crankshaft 40.

Figure 1B:
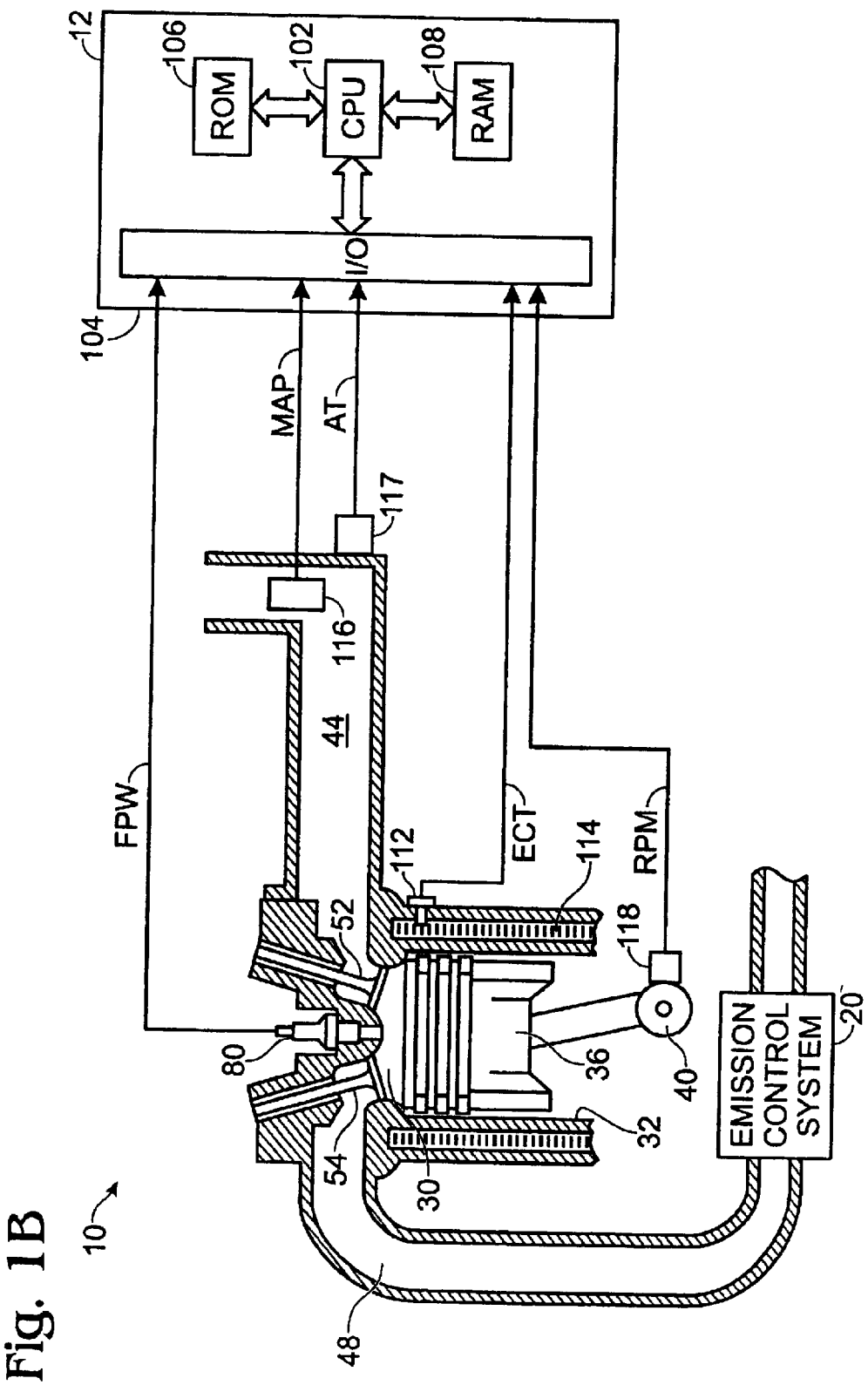
Figure 1C:
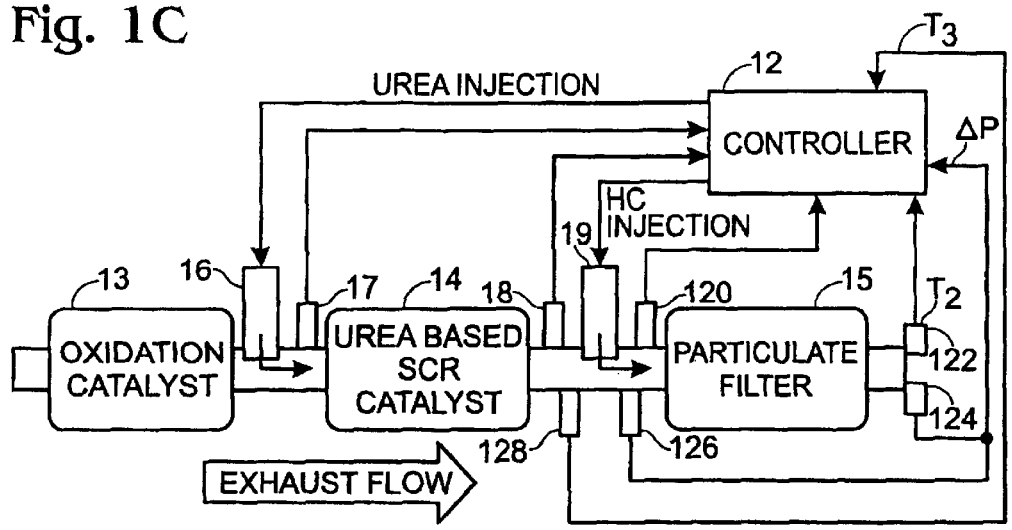
FIGS. 1C–1E are schematic diagrams of exemplary embodiments of an emission control system in accordance with the present invention.
Figure 1D:
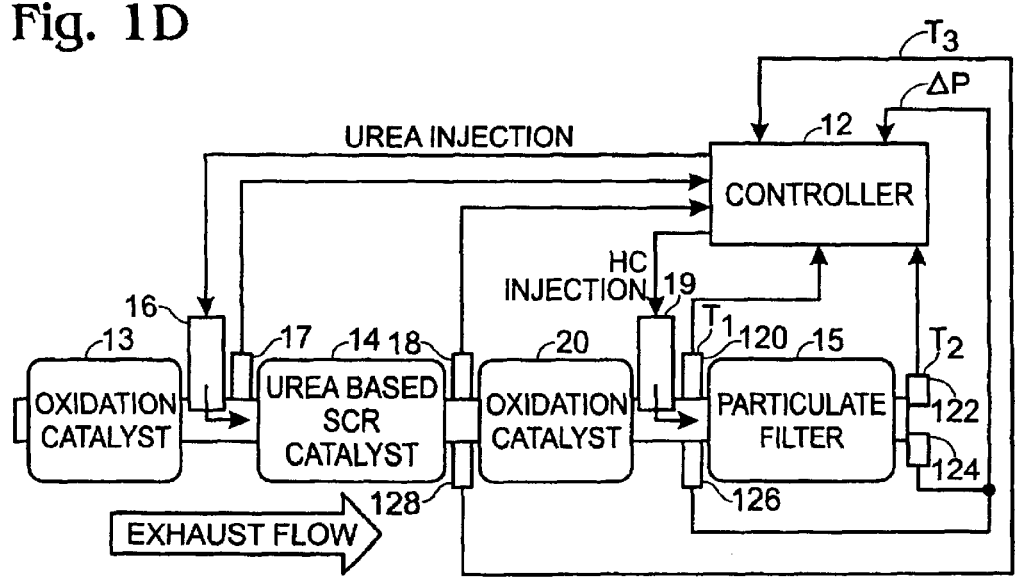
Figure 1E:
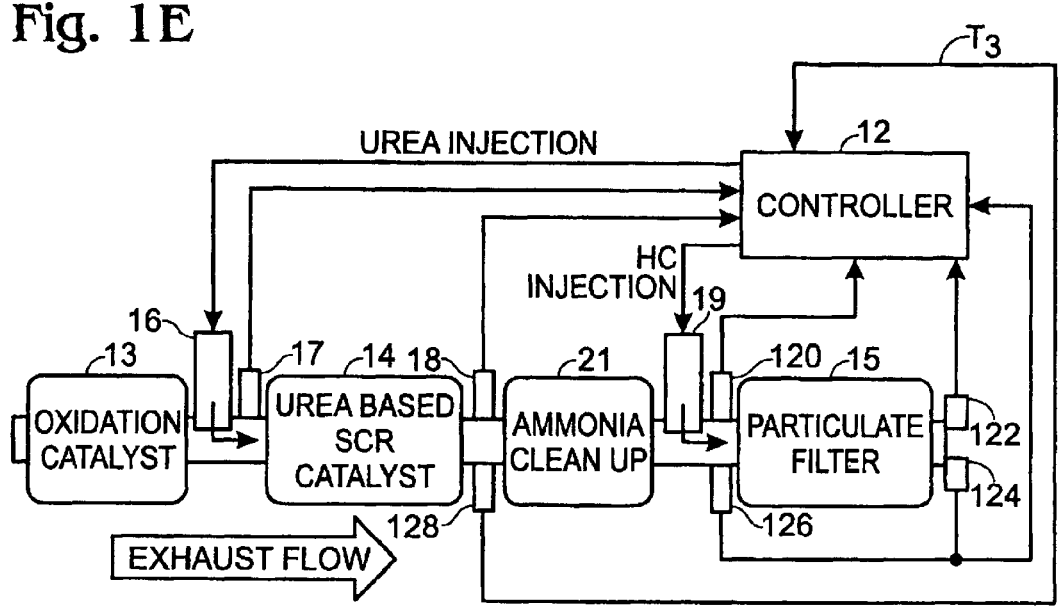

An emission control system 20 is coupled to an exhaust manifold 48 and several exemplary embodiments of the system in accordance with the present invention are described with particular reference to FIGS. 1C–1E.

Referring now to FIG. 1B, an alternative embodiment is shown where engine 10 is a direct injection engine with injector 80 located to inject fuel directly into cylinder 30. Fuel is delivered to fuel injector 80 by a fuel system (not shown), including a fuel tank, fuel pump, and high pressure common rail system.

In one example, engine 10 is a diesel fueled engine that operates with stratified charge combustion in excess oxygen conditions. Alternatively, fuel timing adjustments, and multiple fuel injections, can be utilized to obtain homogeneous charge compression ignition combustion. While lean operation it utilized, it is also possible to adjust engine conditions to obtain stoichiometric or rich air-fuel ratio operation.

In another alternative embodiment, a turbocharger can be coupled to engine 10 via the intake and exhaust manifolds.

Note that in another alternative embodiment, a NOx absorbent type catalyst can be used that stores NOx in an oxygen rich environment, and releases/reduces stored NOx in a oxygen deficient environment.

Referring now to FIG. 1C, the emission control system 20 includes a urea based Selective Catalytic Reduction (SCR) 14 coupled downstream of an oxidation catalyst 13. A particulate filter 15 is also shown coupled downstream of the catalyst 14. The SCR catalyst is, in one example, a base metal/zeolite formulation with optimum NOx conversion performance in the range of 200–500° C. Reductant, such as aqueous urea, is stored in a storage vessel (not shown) and delivered to a reductant delivery system 16 coupled to exhaust manifold 48 upstream of SCR catalyst 14. The reductant is metered out by a pump through a control valve, where both the pump and the valve are controlled by controller 12. Air and reductant are injected into the reductant delivery system and are vaporized by a heated element, with the resulting vapor introduced into the exhaust gas mixture entering the SCR catalyst. Alternatively, any other structure known to those skilled in the art to deliver reductant to an exhaust gas aftertreatment device may be used.

NOx sensors, $NOx_1$ (17) upstream, and $NOx_2$ (18) downstream of the SCR, are coupled in the path of the exhaust gas entering and exiting the SCR catalyst. The outputs of these sensors are read by controller 12 and may be used to determine the NOx conversion efficiency of the SCR. Alternatively, $NOx_1$ sensor 17 can be eliminated and the amount of NOx in the exhaust gas mixture entering the SCR catalyst can be estimated based on engine speed, load, exhaust gas temperature or any other parameter known to those skilled in the art to affect engine NOx production.

Oxidation catalyst 13 is a precious metal catalyst, preferably one containing platinum, for rapid conversion of hydrocarbons (HC), carbon monoxide (CO) and nitrous oxide (NO) in the engine exhaust gas. The oxidation catalyst is also used to supply heat for fast warm up of the SCR catalyst 14, which is done by increasing the HC concentration in the exhaust gas entering the oxidation catalyst, wherein an exotherm is created when the extra HC is reduced over the oxidation catalyst. This can be accomplished through, for example, in-cylinder injection during either or both of a power or exhaust stroke of the engine (in a direct injection engine) or any of a number of other alternatives, such as retarding injection timing, increasing EGR and intake throttling, or any other means known to those skilled in the art to increase the HC concentration in the exhaust gas. Alternatively, hydrocarbons may be injected directly into the exhaust gas stream entering the oxidation catalyst employing any means known to those skilled in the art. Reductant delivery system 19, may be used to deliver HC from the fuel tank or from a storage vessel to the oxidation catalyst 13 to generate extra heat to warm up the SCR catalyst.

Particulate filter (PF), in one example a diesel particulate filter (DPF)) 15 is coupled downstream of the SCR catalyst and is used to trap particulate matter (soot) generated during the drive cycle of the vehicle The PF can be manufactured from a variety of materials including cordierite, silicon carbide, and other high temperature oxide ceramics. Once soot accumulation has reached a predetermined level, regeneration of the filter can be initiated as described below herein. Filter regeneration is accomplished by heating the filter to a temperature that will burn soot particles at a faster rate than the deposition of new soot particles, for example, 400–600° C. The inventors have recognized that using increased engine exhaust gas production to increase the particulate filter temperature to regeneration temperature may result in thermal damage to the upstream SCR catalyst in the system configuration of the present invention. Accordingly, the inventors recognized that, in an alternative embodiment, the filter could be regenerated by extra hydrocarbon injection downstream of the SCR catalyst. In on approach, a reductant delivery system (19), is coupled to the exhaust gas manifold between the SCR catalyst and the particulate filter to supply a vaporized mixture of hydrocarbon (e.g., diesel fuel or some other reductant) and air to the particulate filter thereby achieving regeneration temperatures. In one example, the PF can be a catalyzed particulate filter containing a washcoat of precious metal, such as Platinum, to lower soot combustion temperature and also to oxidize hydrocarbons and carbon monoxide to carbon dioxide and water.

Therefore, improved emission control can be achieved by placing an oxidation catalyst upstream of a urea-based SCR catalyst and a particulate filter downstream of the SCR catalyst. This system configuration provides opportunities for fast warm-up of the SCR catalyst via an exotherm created by the upstream oxidation catalyst and higher exhaust gas temperature during light-load vehicle operation. Additionally, since the particulate filter is located downstream of the SCR catalyst, there is no risk of thermal damage to the SCR catalyst during filter regeneration and therefore separate cooling means are not required. Further, the particulate filter reduces tailpipe ammonia emissions by oxidizing ammonia that may slip from the SCR catalyst.

Figure 5:
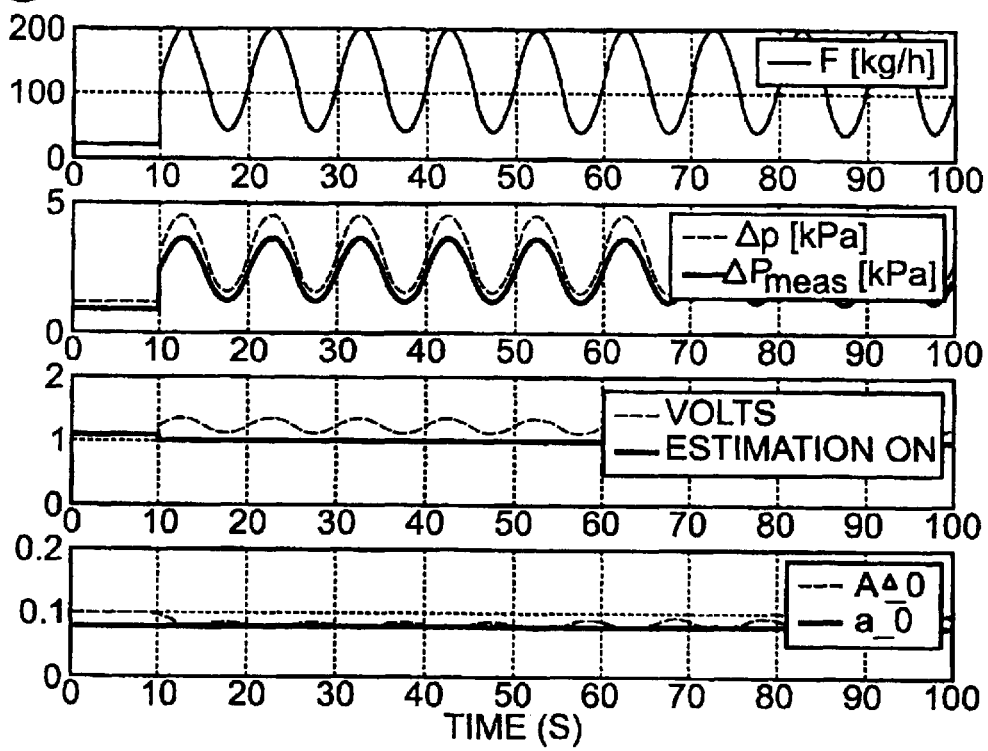
FIGS. 5–6 are show a simulation of the pressure sensor monitor of one aspect of the invention.

Generally, controller 12 controls the amount and timing of urea and HC injection in accordance with engine operating parameters such as the amount of exhaust gas NOx, exhaust gas temperature, catalyst temperature, and various other parameters. Specifically, when particulate filter regeration is requested, controller 12 control the amount and timing of HC injection upstream of the particulate filter in order to raise the filter temperature to a desired regeneration temperature. FIG. 5, described below, provides additional description of how reductant injection is calculated to reduce NOx emissions efficiently.

In an alternative embodiment, the exhaust system can include only oxidation catalyst 20 and particulate filter 15, without device 13, 14, and 16. In this case, air assisted diesel fuel injection (or another suitable reductant) upstream of the DPF is still utilized via device 19.

Further note that additional temperature sensors 120 and 122 are shown coupled upstream and downstream of the DPF, respectively. Further, a differential pressure signal ($\Delta p$) is shown being determined from pressure sensors 124 and 126. Note that a single differential pressure can also be used to measure the differential pressure across DPF 15. Further, a temperature sensor (128) before a diesel oxidation catalyst (DOC) is also utilized. In one example, the pressure sensor (s) can be piezo-electric type sensors. However, various other types of pressure sensors can be used, such as, for example: resistive type, capacitive type, or various others.

FIG. 1D depicts an alternative embodiment of an emission control system in accordance with the present invention, wherein an additional oxidation catalyst 20 is placed upstream of the PF to lower soot combustion temperatures. The oxidation catalyst may be a separate catalyst or may be integrated with the particulate filter by washcoating it onto the PF inlet (not shown). The washcoating reduces overall system size and improves its thermal management.

FIG. 1E is yet another alternative embodiment of the present invention wherein an ammonia clean-up catalyst 21 is placed between the SCR catalyst and the particulate filter. The ammonia clean-up catalyst selectively converts some of the ammonia that may slip form the SCR catalyst to nitrogen. This increases overall system NOx conversion efficiency since it prevents the particulate filter from converting slipped ammonia into NOx.

Still another alternative configuration is to utilize a particulate filter in an upstream location, with optional additional catalysts located downstream of the particulate filter.

As described above, the diesel particulate filter (DPF) filters to reduce emission of particulate matter. DPFs collect soot through a wall filtering process. Increasing soot load on the DPF increases the back pressure which has a negative effect on fuel economy. Therefore, this soot is burnt off (regenerated) at selected intervals, e.g., every several hundred miles of vehicle travel, or when differential pressure reaches a selected value, or when exhaust back-pressure reaches a threshold value.

In one example, the downstream injector, injecting atomized diesel fuel into the exhaust manifold or in the downpipe after the turbo, may aid in regenerating the DPF. The differential pressure sensor monitors the soot loading of the DPF and is used in the detection of degradation of the DPF.

Generally, the pressure drop ($\Delta p$) across the DPF is affected by the volumetric flow (F) and the soot loading of the DPF, as well as other factors (which can be included if desired). The pressure drop consists of contraction and expansion losses, frictional losses of the flow along the walls, and pressure losses due to the flow through a porous medium. For a clean DPF, the relation between pressure drop and flow can be approximated by the Darcy-Forchheimer equation (1):

$$\Delta p = c_0 + c_1 \cdot v \cdot F + c_2 \rho \cdot F^2 \qquad (1)$$

The soot load in the DPF has an effect mostly on the linear term in this equation (see A. G. Konstandopoulos, E. Skaperdas, M. Masoudi, "Inertial contributions to the pressure drop of diesel particulate filters", SAE 2001-01-0909; and A. G. Konstandopoulos, M Kostoglou, E. Skaperdas, E. Papaioannou, D. Zarvalis, E. Kladopoulou, "Fundamental studies of diesel particulate filters: transient loading, regeneration and aging", SAE 2000-01-1016). Utilizing this information, it is possible to form the following relationship of equation (2):

$$\Delta p = R(\text{soot})(c_0 + c_1 v \cdot F) + c_2 \rho \cdot F^2 =: g(\text{soot}, F) \qquad (2)$$

where, F is volumetric flow, $\rho$ is density, and $v$ is viscosity).

The coefficients $c_i$ can be obtained from experimental flow testing of the DPF. Further, the density and viscosity of exhaust gas can be estimated based on exhaust gas temperature and experimental test data. The restriction R(soot) is a monotonic function of the soot load in grams/liter. In one approach, when the soot loading is above a certain limit, a DPF soot regeneration is initiated to burn off the soot (See steps 214–218 of FIG. 2, described below). In an alternative embodiment, the routine can simply set monitor whether differential pressure reaches a set differential pressure threshold value.

Alternatively, when the restriction is below a certain level corresponding to a clean DPF, the DPF can be degraded and emitting increased soot levels, provided the reading from the delta pressure sensor is correct.

These operations are now described more fully with specific reference to the following routines.

As will be appreciated by one of ordinary skill in the art, the routines described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the invention, but is provided for ease of illustration and description. Although not explicitly illustrated, one of ordinary skill in the art will recognize that one or more of the illustrated steps or functions may be repeatedly performed depending on the particular strategy being used.

Referring now to FIG. 2, a routine is described for controlling regeneration of the particular filter. First, in step 210, the routine measures operating conditions including exhaust gas flow (F), exhaust temperature, and various other factors. Then, in step 212, the routine determines the maximum soot loading (Rmax) above which a regeneration of the particular filter is requested. The maximum soot loading value can be determined via experimental testing, or be set to a variable value depending on operating conditions. Next, in step 214, the routine calculates the maximum differential pressure ($\Delta$Pmax) that corresponds to the maximum soot loading at the current operating conditions according to the equation indicated in FIG. 2.

Next, the routine continues to step 216 where the routine compares whether the current measured differential pressure ($\Delta$P) is greater than or equal to the maximum pressure difference allowed as determined from step 214. When the answer to step 216 is "yes", the routine requests a particulate filter regeneration in step 218. Various methods can be utilized to perform particulate filter regeneration, such as, for example: utilizing post-engine fuel injection to create an exothermic reaction to raise temperature of the particulate filter to an auto ignition temperature where the particulate matter stored in the filter is burned off.

Continuing with FIG. 2, the routine continues to step 220 where the routine compares whether the measured differential pressure is less than a minimum differential pressure ($\Delta Pmin$). The minimum differential pressure is the minimum restriction that should be present at the current operating conditions assuming the device is trapping particulate. When the answer to step 220 is "yes", the routine continues to step 222 to indicate degradation of the catalyst.

Note that in step 216, the current measured differential pressure is determined using the transfer function of equation 4. In one particular example, the routine utilizes the nominal values a0, and B0, for the assumed current values a1, and b1. In an alternative embodiment, the routine uses the adaptive parameters of the slope and offset as determined herein below with regard to FIGS. 3 and 4, for the current values of b1, and a1.

Sensor Monitoring

The nominal sensor signal can be related to the pressure as shown in equation (3):

$$\Delta p\_volts = a0 * \Delta p + b0 \quad (3)$$

Thus, the transfer function from input voltage to pressure inverts this signal as shown in equation (4):

$$\Delta p = (\Delta p\_volts - b_1)/a_1 \quad (4)$$

where nominally: $b_1 = b_0$ and $a_1 = a_0$.

Nominal values $b_0$ and $a_0$ can be based on statistical data on the average or median values of production sensors. These nominal values can be stored in the memory (e.g., KAM) of controller 12.

A possible degraded condition of the pressure sensor that can occur during vehicle operation is a change in offset $b_0$, such that the actual value $b_1$ is not equal to $b_0$. Such degradation can be detected as described with regard to FIG. 3.

Referring now to FIG. 3, a routine is described for determining degradation of the exhaust pressure sensor via detected change in the sensor offset. First, in step 310, the routine determines whether the vehicle key is in the key "on" position. When the answer to step 310 is "yes", the routine continues to step 312. In step 312, the routine determines whether the engine is in the "off" condition (e.g. whether engine speed is less than a predetermined speed). When the answer to step 312 is "yes", the routine continues to step 314 to read the sensor voltage ($\Delta P\_volts$) and save this as the estimated value of the offset bhat1 ($\hat{b}_1$). Next, the routine continues to step 316 to determine whether sensor offset monitoring has been enabled. This enabling is based on various operating conditions, such as, for example: engine coolant temperature, and various other parameters.

When the answer to any of steps 310, 312, 314, or 316 is "no", the routine simply ends.

In step 318 (from a "yes" answer to step 316) the routine determines whether the absolute value of the difference between the estimated offset value from step 314 and the saved nominal sensor offset (B0) is greater than a threshold value $\epsilon 1$. When the answer to step 318 is "no", the routine decrements counter C1 in step 320. Alternatively, when the answer to step 318 is "yes", the routine increments counter C1 in step 322. From either steps 320 or 322, the routine continues to step 324 to determine whether the counter value C1 is greater than a limit value L1. When the answer to step 324 is "yes", a degrader sensor offset has persisted for a sufficient period that a sensor offset degradation is indicated in step 326. The routine then ends.

In general terms, the routine thus determines the sensor reading and conditions where it is estimated that the differential pressure that is measured in the exhaust should be substantially zero because there is substantially no flow. Thus, the conditions of steps 310 and 312 are one example of such conditions. Also note that the estimated value of the offset (bhat1, $\hat{b}_1$) of step 314 can be used as described herein as an adaptive value in the transfer function to determine the actual differential pressure and thereby provide increased pressure accuracy, when it is determined that such an adaptive value accounts for in range sensor drifts. Also note that the value B0 utilized in step 318 is the nominal expected value based on statistical sampling of sensor offset of properly functioning sensors. Also note that the indication in step 326 can be utilized to determine that the sensor is degraded and therefore default operation should be utilized and a light illuminated to notify the vehicle driver. Default operation can include, for example, disabling particulate filter regeneration, or various other modifications.

Thus, in this aspect of the present invention, degradation of the pressure sensor that results in variation in the offset can be determined by reading $\Delta p\_volts$ when the control system is keyed on and the engine has not started yet. In other words, since the actual flow is known (here, it is known to be substantially zero), the voltage reading ($\Delta p\_volts$) equals=$b_1$, and it is possible to determine the transfer function offset value.

A second possible degraded condition of the pressure sensor that can occur is a change in gain, such that the actual value $a_1$ is not equal to $a_0$. One potential source of such degradation can include deposits on the membrane of the sensor. The sensor will then give degraded readings, potentially resulting in too frequent, or too infrequent, particulate filter regeneration.

To monitor such a condition, this aspect of the present invention takes advantage of the fact that soot build-up is a relatively slow process (that occurs over hundreds of vehicle miles) so that in a relatively short time span the restriction R can be approximated as relatively constant. In general terms, pressure sensor and exhaust gas flow readings across two or more conditions [($\Delta p_1$, $F_1$), ($\Delta p_2$, $F_2$)], occurring in a relatively short time span, are utilized. Since the restriction due to soot buildup has generally remained unchanged, the following relationship of equation (5) can be utilized to characterize normal operating conditions, independent of the soot loading:

$$\frac{\Delta p_1 - c_2 \rho \cdot F_1^2}{\Delta p_2 - c_2 \rho \cdot F_2^2} = \frac{c_0 + c_1 v \cdot F_1}{c_0 + c_1 v \cdot F_2} \quad (5)$$

In one example embodiment, if these at least two values are far apart (beyond a certain calibratable value), a change in gain $a_0$ has occurred, and a flag indicates the delta pressure sensor has degraded. In addition, if more pairs ($\Delta p_i$, $F_i$) are obtained, a routine can compute the quotients for all pairs and check the difference for all quotients. Thus, even though we when the soot loading is not precisely known, or not known at all, the quotients should be nearly equal regardless of soot loading. As such, it is possible to accurately determine sensor gain degradation by utilizing information across at least two operation conditions.

In an alternative approach, an adaptive algorithm it utilized to adaptively learn the actual gain value. This adaptively learned gain can be used both to more accurately measure the differential pressure, and to monitor for sensor degradation.

From Equations (2) and (4) above, an equation for the gain can be derived as shown in equation (6) (where V is shorthand for $\Delta p\_volts$).

$$\frac{\frac{1}{a_0}(V_1 - b_0) - c_2\rho \cdot F_1^2}{\frac{1}{a_0}(V_2 - b_0) - c_2\rho \cdot F_2^2} = \frac{c_0 + c_1 v \cdot F_1}{c_0 + c_1 v \cdot F_2} = : Q_{lin} \quad (6)$$

$$\Leftrightarrow$$

$$a_0 = \frac{(V_1 - b_0) - Q_{lin}(V_2 - b_0)}{c_2\rho \cdot (F_1^2 - Q_{lin}F_2^2)} = : \hat{a}_0$$

In one example, the first condition at which the first values ($V_1$ and $F_1$) are determined is right after engine start, at key-on. Further, these values can be averaged for a preselected amount of time. Alternatively, these values can be read before the exhaust flow $F_1$ is above a certain threshold (L2), or averaged until the exhaust flow $F_1$ is above the threshold. In still another example, the values can be read during engine idling conditions.

Then, the routine calculates a0hat ($\hat{a}_0$) at each sample instant that $F_2$ is greater than a certain threshold (L3) as shown in equation (7) (note that equation 7 uses a low pass filter with coefficient filter constant kf). The calculation in Equation (6) becomes more accurate if $F_1$ and $F_2$ differ by a selected amount, which is why $F_1$ is recorded, in one example, at low flow (e.g., idle) and $F_2$ is recorded at, in one example, high flow.

$$\hat{A}_0(t+1) = k_f \hat{A}_0(t) + (1-k_f)\hat{a}_0(t+1) \quad (7)$$

where t is the sample count, which in one example represent sample time. Note, however, that unequal sample times can be used, as well as event based filters where samples are obtained at firing intervals. Further note than an alternative filter can be used rather than the form shown in Equation (7).

This estimate ($\hat{A}_0$) will converge to the true $\hat{a}_0$, within the accuracy of the assumptions of relatively constant soot loading and $F_1$ and $F_2$ being far enough apart.

If $\hat{A}_0$ and $a_0$ differ by more than a calibratable amount, a gain degradation of the pressure sensor is indicated. This is described more fully below with regard to FIG. 4.

Figure 4:
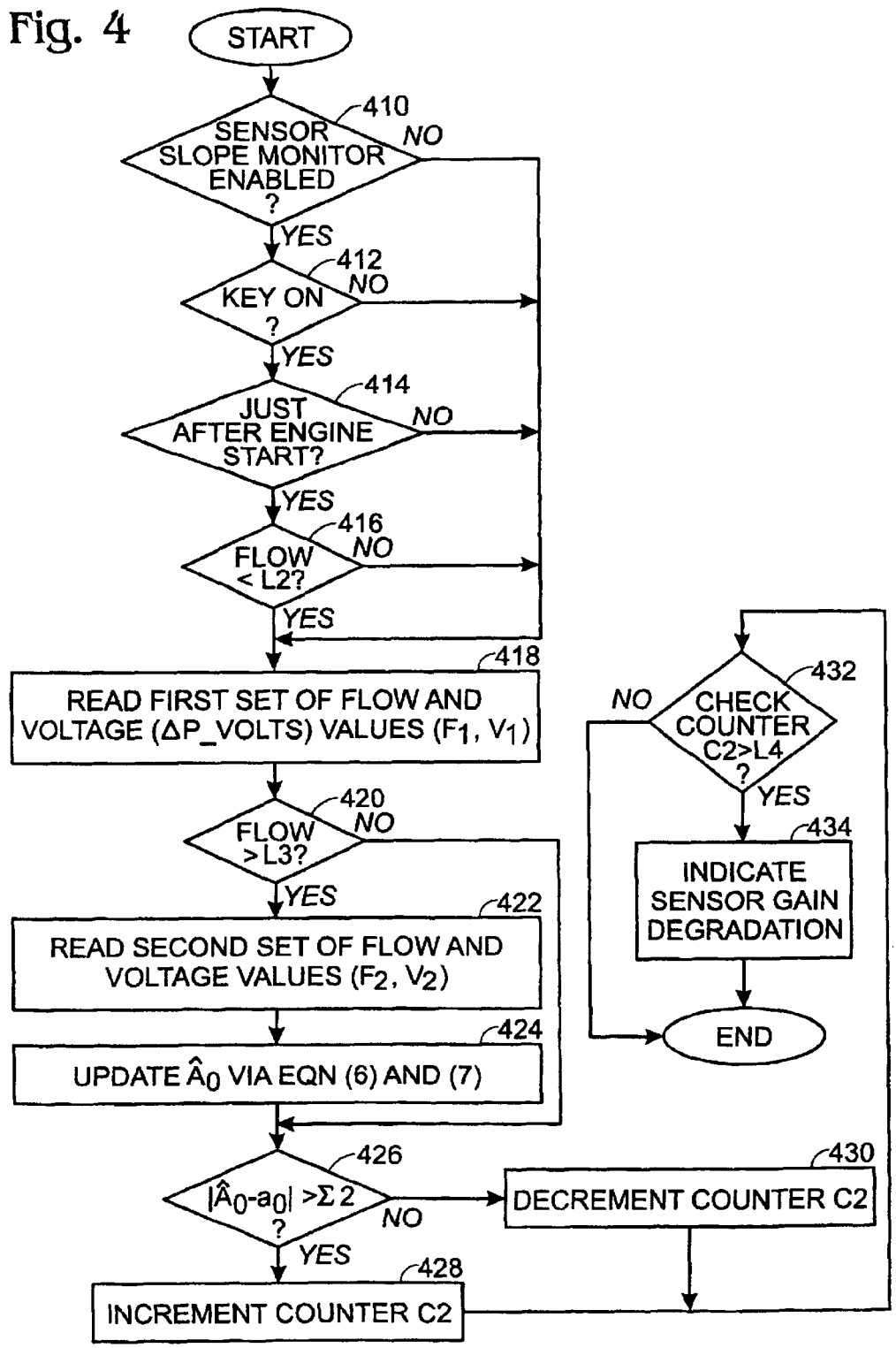

Referring now to FIG. 4, a routine is described for monitoring the sensor gain of the differential pressure sensor. First, in step 410, the routine determines whether the sensor slope monitoring is enabled based on various conditions such as, for example, engine coolant temperature being greater than a threshold value. When the answer to step 410 is "yes", the routine continues to step 412. In step 412, the routine determines whether the vehicle is in a key "on" position. When the answer to step 412 is "yes", the routine continues to step 414. In step 414, the routine determines whether the current operating conditions are just after an engine start. For example, the routine can determine whether the engine speed is greater than a predetermined engine speed indicating a successful engine start. Alternatively, the routine can simply monitor whether the vehicle is currently in the engine idling condition.

When the answer to step 414 is "yes", the routine continues to step 416. In step 416, the routine determines whether the exhaust flow (F) is less than a threshold value (L2). When the answer to step 416 is "yes", the routine continues to step 418. In step 418, the routine reads the first set of flow and voltage values (F1, V1). When the answer to any of steps 410 through 416 is "no", the routine bypasses step 418 and continues directly to step 420. From step 418, the routine also continues to step 420. In step 420, the routine determines whether the exhaust flow rate is greater than a threshold value (L3). When the answer to step 420 is "no", the routine simply ends. Alternatively, when the answer to step 420 is "yes", the routine continues to update the estimated sensor gain value in steps 422 and 424 as described below.

In step 422, the routine reads the current flow and voltage values and sets these values temporarily to (F2, V2). Then, using equations 6 and 7, the routine updates the estimated, and averaged, gain value ($\hat{A}_0$). From step 424, the routine continues to then utilize the updated and averaged adaptive gain value to determine whether the pressure sensor has degraded.

Specifically, from step 424, the routine continues to step 426. In step 426, the routine determines whether the absolute value of the difference between the adaptive gain estimate and the nominal (expected) gain value (A0) is greater than a threshold value ($\epsilon 2$). When the answer to step 426 is "yes", the routine increments counter C2. Alternatively, in step 430, the routine decrements counter C2. From either steps 428 or 430, the routine then continues to step 432 to determine whether the counter value is greater than a threshold value (L4). When the answer to step 432 is "no", the routine ends. Alternatively, when the answer to step 432 is "yes", the routine indicates degradation of the sensor (i.e. degradation of the sensor gain).

In this way, the estimate of the sensor gain value can be used to monitor whether the sensor is providing accurate and reliable information. When the adaptive estimate of the sensor gain moves outside of an acceptable value (which can be determined based on statistical data of a batch of pressure sensors), sensor degradation can be indicated to the vehicle driver via an illuminator lamp.

Also, in this way, it is possible to determine the sensor response when exhaust flow is greater than a threshold value. Operating in such a way produces increased accuracy by ensuring updates at sufficiently distinct flow conditions. Thus, the updated parameter can be compared to an expected value to determine sensor degradation.

Note also that it is possible to use the diagnostic methods described herein for either absolute or differential pressure sensor used in controlling the DPF. For example, if using an absolute pressure sensor, it can be located upstream of the DPF and used in combination with an estimate of exhaust pressure based on speed load to form the differential pressure.

Thus, by monitoring the sensor as described in FIGS. 3 and 4, it is possible to detect both, or either, slope and offset variations in the sensor output versus pressure. This information can then be used to detect degradation of the sensor. Also by gating out updates of the estimation during selected conditions (for example high flow conditions), a more accurate result is obtained.

Figure 6:
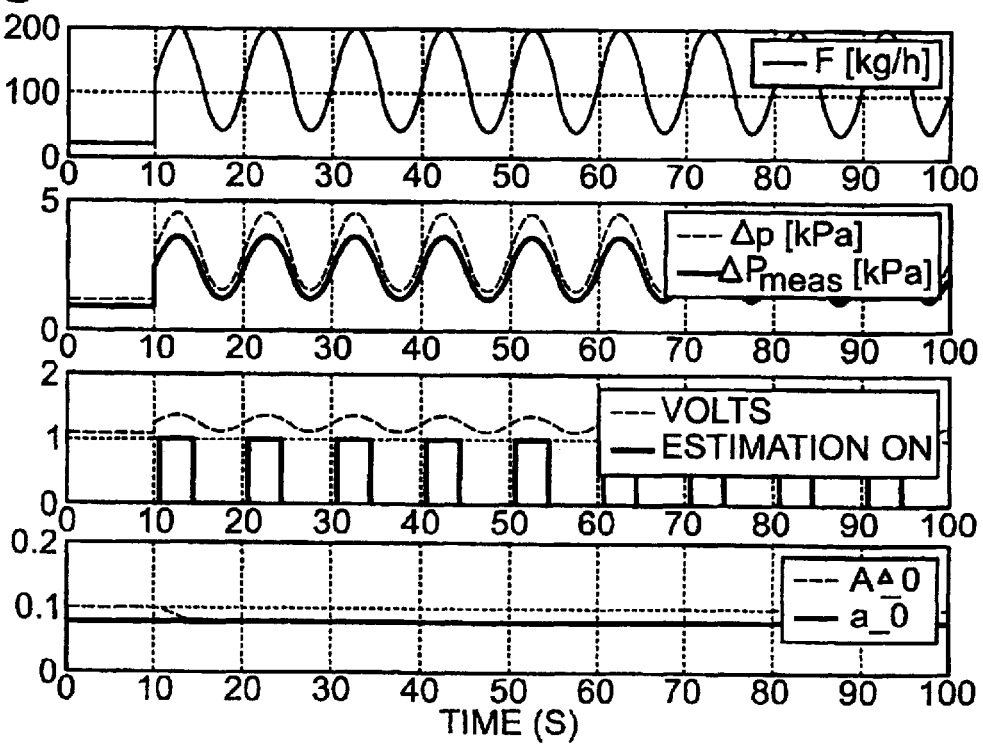

FIGS. 5 and 6 show a simulation of the pressure sensor monitor. The first 10 seconds are at idle and are used to set a reference for F and dp_volts. The top window in FIG. 5 shows the flow input, a sinusoidal trace. The second window shows the real and measured pressure drop when the actual sensor gain a0=0.08 and the calibrated gain, or expected value, is a1=0.1. The $3^{rd}$ window shows the resulting voltage trace and the flag that indicates when the flow is high enough for the monitor to be estimating the gain. In FIG. 5 the threshold (L3) is 40 kg/h. The 4$^{th}$ window shows the resulting estimate of $Â_0$ from equation (7). In FIG. 6 the threshold is L3 is set to 150 kg/h, and the 4$^{th}$ window shows that the estimate becomes more accurate when the pair ($\Delta$p, F), is sampled at flow conditions farther away from the idle reference point.

Note that there are various alternative approaches, and modifications that can be made according to the present invention. These are summarized below.

As one example, the routines of FIGS. 3 and 4 may wait to reach steady state conditions before sampling a pair ($\Delta$p, F), to reduce transient effects on sampled data. For example, the routine may wait a predetermined time before enabling sensor monitoring in step 410. Alternatively, the routine may wait a predetermined number of engine revolutions, or may enable monitoring when variations in flow conditions are below a threshold amount. In yet another alternative, the routines of FIGS. 3 and 4 may wait for exhaust temperature to reach a certain value before sampling a pair ($\Delta$p, F) to obtain more accurate readings. Further still, the enabling of step 410 can be limited to a period where it is determined that the variation of soot loading is less than a preselected amount of soot (e.g., less that 5%, 10%, 30%, etc. of soot loading).

The diagnostic approaches described herein apply to other configurations with pressure sensors, or differential pressure sensor used across a device of which the flow characteristic is determinative in the shorter term, albeit slowly changing over larger time scales. For example, the routines described herein can be used to monitor pressure sensors that monitor gradual clogging in evaporative leak detection systems.

In such alternative system configurations, if a slowly changing parameter enters in an additive fashion in the flow characteristic (rather than in a multiplicative form), the difference $\Delta$p1–$\Delta$p2 and g(F1)–g(F2) can be computed instead of the quotient, and the difference between these differences compared. Alternatively, if the flow characteristic is such that there is another mathematical operation, (e.g., operation X{}) that renders X(g(F1), g(F2)) independent of the slower varying parameter (soot loading in our case), then the routine can use that operation X{} to compare the readings.

Further, as described above, if several quotients $\Delta$pi/$\Delta$pj yield a value different from the gain of the transfer function a0, the adapted a0 can be used to reflect the new values, and to maintain a reduced capability operation of the system. This is the calculation for $Â_0$ in Eq (7). In other words, even though the sensor is operating in an unexpected, and degraded fashion, it is possible to use the adaptive nature of the routines to account for this degradation to still provide acceptable vehicle operation until further action is taken.

Note also that the sensor monitor is also applicable to any general transfer function from volts to pressure, not just a linear one. In other words, if a pressure sensor is utilized that responds non-linearly in output voltage to changes in sensed pressure, then this new transfer function can simply be used in place of the linear function used in the description above. For example, the routine can be modified to first invert the nominal nonlinearity so that the relation becomes linear and then apply the above algorithms for monitoring offset and gain.

Finally note that the monitoring approach described herein applies equally well to other sensors that have a known shorter term characteristic between a dependent and an independent variable ($\Delta$p=g(F) in the above), but are subject to a larger time-scale drift (the dependence of g on soot in the above).

If it has been determined that the sensor used for controlling DPF regeneration has degraded, then an illumination lamp can be activated to notify the vehicle operator. Further, default operation is utilized where DPF regeneration is suspended. Alternatively, DPF regeneration can be continued but enabled based on other methods, such as based on vehicle distance traveled, an estimate of soot stored in the DPF as described above, or various other methods.

Figure 7:
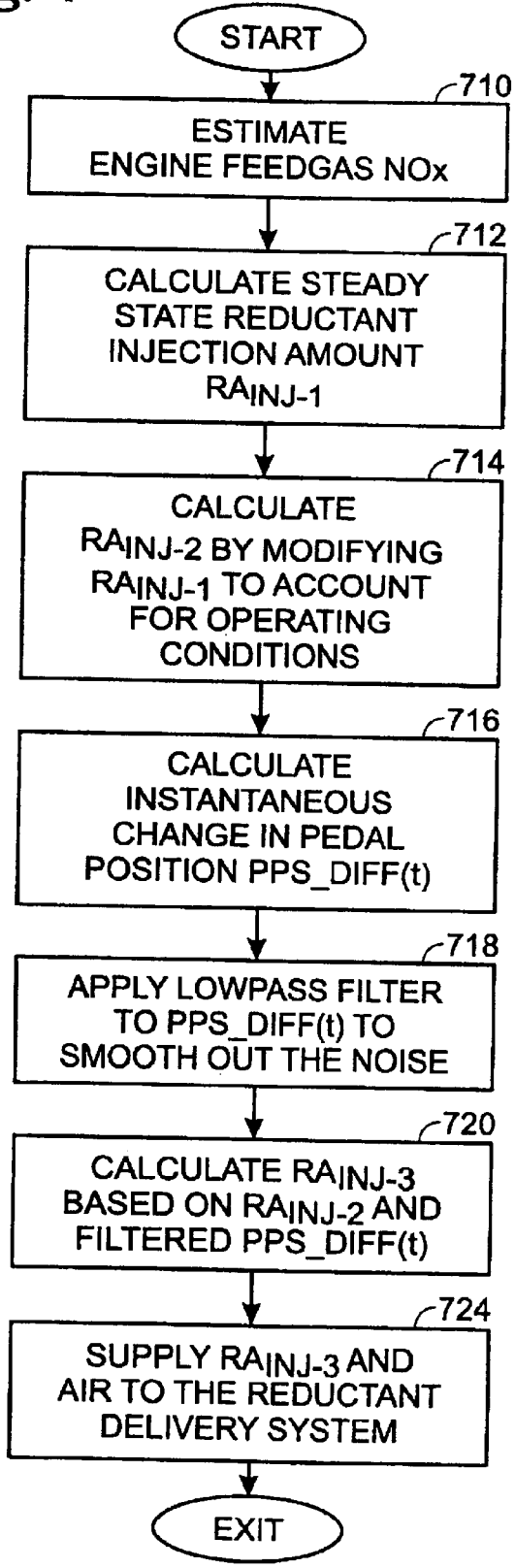
FIG. 7 is an exemplary routine for the SCR catalyst regeneration in accordance with the present invention.

Referring now to FIG. 7, an exemplary routine for controlling injection of a reductant into the SCR catalyst using a reductant delivery system is presented. First, in step 710, the amount of NOx in the exhaust gas mixture entering the device, $NOx_{fg}$, is estimated based on engine operating conditions. These conditions may include engine speed, engine load, exhaust temperatures, exhaust gas aftertreatment device temperatures, injection timing, engine temperature, and any other parameter know to those skilled in the art to indicate the amount of NOx produced by the combustion presses. Alternatively, a NOx sensor may be used to measure the amount of NOx in the exhaust gas mixture. Next, in step 712, the steady-state reductant injection amount, $RA_{inj\_1}$, is calculated based on the following equation:

$$\frac{(RA_{fg} + RA_{inj\_1})}{NOx_{fg}} = R_{des}$$

wherein $RA_{fg}$ is the amount of reductant in the engine feedgas, which can be determined based on engine operating conditions. This initial reductant amount, $RA_{inj\_1}$, is evaluated at steady state and yields a base reductant quantity to be injected for each engine speed and load point. The amount is calibrated to achieve a certain feedgas reductant to NOx ratio, $R_{des}$. The ratio is typically obtained as a trade-off between NOx conversion and the fuel penalty due to reductant injection, and in this example is set at approximately 10. Next, in step 700_, the steady-state base reductant injection amount, $RA_{inj\_1}$, is modified to account for engine operating conditions such as engine coolant temperature, $T_c$, exhaust gas temperature, $T_{eg}$, EGR valve position, $EGR_{pos}$, start of injection, SOI, and other parameters:

$$RA_{inj\_2} = RA_{inj\_1} \cdot f_1(T_c) \cdot f_2(T_{eg}) \cdot f_3(SOI) \cdot f_4(EGR_{pos})$$

The routine then proceeds to step 716 wherein the instantaneous change in the pedal position is computed as follows:

$$pps\_diff(t) = \frac{(pps(t) - pps(t-1))}{T_s}$$

where $T_s$ is the sampling rate, and pps(t) denotes the pedal position at time t. Next, in step 718, a low pass filter is applied to smooth out the noise:

$$pps\_diff\_lp(t) = (1-k_f) \cdot pps\_diff\_lp(t-1) + k_f \cdot pps\_diff(t-1)$$

where $k_f$ controls the rate of filtering. The routine then proceeds to step 720 wherein the reductant amount is further modified to account for engine transient behaviors as represented by the changes in the pedal position:

$$RA_{inj\_3} = RA_{inj\_2} \cdot f_5(pps\_diff\_lp)$$

where function $f_5$ is shaped to allow overinjection of reductant during pedal position tip-in and underinjection of reductant during pedal position tip-out. In an alternative embodiment, instead of pedal position, engine speed or fuel demand sensor, or any other parameter known to those skilled in the art to provide a measure of engine transient behavior may be used to obtain $RA_{inj\_3}$.

Figure 8:
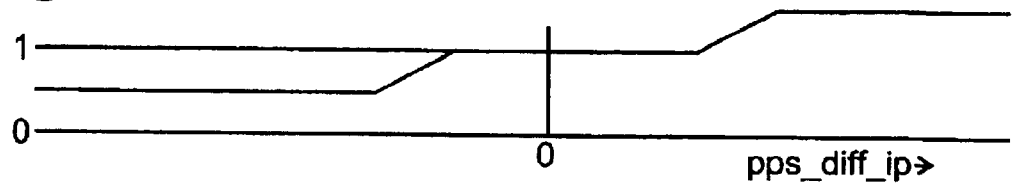
FIG. 8 is an example function used in the routine of FIG. 7.

The routine then proceeds to step 724 wherein $RA_{inj\_3}$ and air are supplied to the reductant delivery system 19. The routine then exits. An example of $f_5$ is shown with particular reference to FIG. 8.

Therefore, according to the present invention, in order to achieve more efficient NOx conversion efficiency of an SCR catalyst, the amount of reductant to be injected can be adjusted to account for changes in the amount of NOx in the engine exhaust gas that are caused by engine transient behavior. This is accomplished by continuously monitoring engine parameters that are capable of providing a measure of engine transient behaviors, such as a pedal position sensor, and adjusting the amount of reductant to be injected as a function of filtered instantaneous changes in these parameters. Since NOx production typically increases at tip-in and decreases at tip-out, the result of such operation would be to increase the base injected amount in the former case, and decrease the base injected amount in the latter case. Further, using a reductant delivery unit ensures fast system response, more efficient system operation, better emission control, and improved fuel economy.

Figure 9:
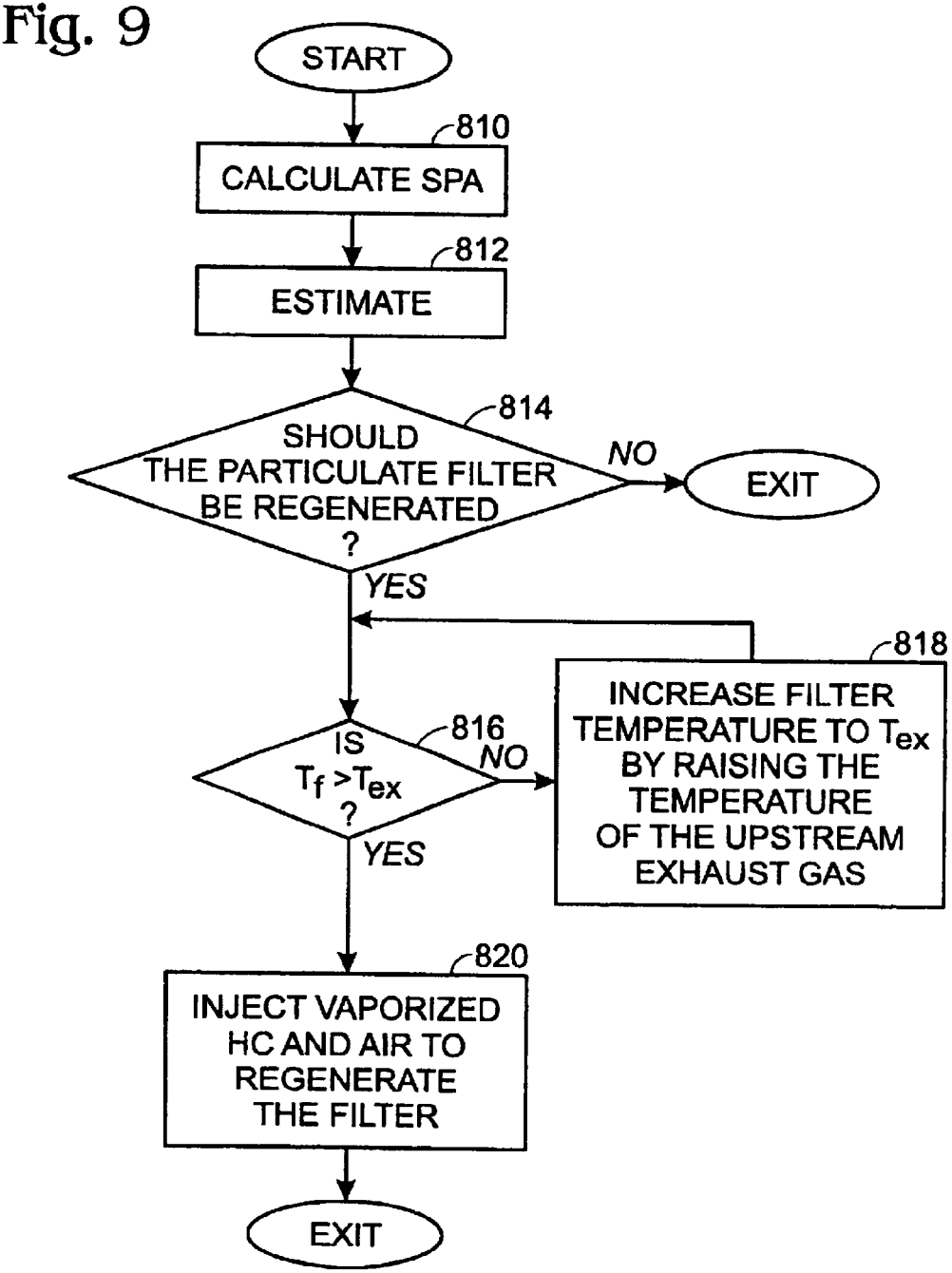
FIG. 9 is an exemplary routine for the particulate filter regeneration in accordance with the present invention.

Referring now to FIG. 9, an alternative example of a method for regenerating a particular filter is presented that can be used in place of, or in addition to, particulate filter regeneration based on a differential pressure measured across the filter.

Since in one example system configuration the particulate filter is located downstream of the SCR catalyst, regenerating the filter by raising the upstream exhaust gas temperature to regeneration temperature through extra hydrocarbon injection to the oxidation catalyst may cause thermal damage to the SCR catalyst. The inventors therefore developed an alternative method of regenerating a particulate filter located downstream of an SCR catalyst wherein the particulate filter temperature is raised to a temperature at which hydrocarbons will react exothermically with oxygen in the exhaust gas, and subsequently extra hydrocarbons are injected into the particulate filter downstream of the SCR catalyst. The resulting exotherm regenerates the filter without causing thermal damage to the SCR catalyst.

First, in step 810, the total particulate amount, spa, stored in the particulate filter is determined. In a preferred embodiment, this amount is constantly updated and is based on the current stored particulate amount and the incremental amount of particulates generated per predetermined sampling time during the combustion process, which is determined based on engine operating conditions such as fuel injection amount and engine speed. Next, the routine proceeds to step 812, wherein the particulate filter temperature, $T_f$, is estimated. In a preferred embodiment, this temperature is estimated based on engine operating conditions using characteristic predetermined maps stored in memory. The engine operating parameters comprise engine speed, fuel injection amount, fuel injection timing, and engine temperature. Any other method known to those skilled in the art for estimating a temperature of an emission control device may be used to advantage with the present invention.

Next, in step 814, a determination is made whether the particular filter should be regenerated. In particular, if the stored particulate amount (spa) is greater than the maximum limit amount S2, or the particulate filter temperature, $T_f$, is greater than the temperature limit T1 and spa is greater than the limit amount S1, regeneration is indicated. Thus, the present invention takes advantage of higher particulate filter temperatures that may be encountered during certain driving conditions by purging stored particulates at that time even if the total spa is below the maximum limit amount S2. Thus, fuel economy is improved by opportunistically regenerating the particulate filter due to the smaller amounts of energy required to increase filter temperature to the regeneration temperature. If the answer to step 814 is NO, the routine exits. If the answer to step 814 is YES, i.e., particulate filter regeneration is indicated, the routine proceeds to step 816 wherein a determination is made whether $T_f$ is greater than $T_{ex}$, which is the temperature above which hydrocarbon will react exothermically with oxygen in the exhaust gas. If the answer to step 816 is YES, the routine proceeds to step 818 wherein a vaporized mixture of hydrocarbon and air is injected into the exhaust gas entering the particulate filter via the reductant delivery system. Alternatively, any other structure known to those skilled in the art to supply reductant to an exhaust gas aftertreatment device may be used. The resulting exotherm then causes the temperature of the particulate filter to increase to the regeneration temperature. The rate of hydrocarbon injection, and the length of injection time required to complete filter regeneration is preferably determined based on operating conditions such as the spa, filter temperature, engine speed, fuel injection amounts, differential pressure etc. Once filter regeneration is completed, the routine exits. If the answer to step 816 is NO, the routine proceeds to step 818, wherein the particulate filter temperature is increased above $T_{ex}$ by raising the temperature of the exhaust gas upstream of the particulate filter such as, for example, by creating an exothermic reaction in the oxidation catalyst 13 through extra hydrocarbon injection, or by engine related measures, such as retardation of injection timing, increasing EGR, or closing an intake throttle. The routine then cycles though step 816 until $T_{ex}$ is reached.

Note that, depending on operating conditions or system configuration, the additional injection of step 820 can be eliminated.

Thus, it is possible to regenerate the particulate filter by first adjusting the temperature of the upstream exhaust gas to raise the temperature of the particulate filter to a temperature above which hydrocarbon will react exothermically with oxygen in the exhaust gas, and then by achieving regeneration temperatures through extra hydrocarbon injection into the filter.

This concludes the description of the invention. The reading of it by those skilled in the art would bring to mind many alterations and modifications without departing from the spirit and the scope of the invention. Accordingly, it is intended that the scope of the invention be defined by the following claims:

We claim:

1. A system for a vehicle having an engine with an exhaust system, the system comprising:
   a pressure sensor coupled in the engine exhaust;
   a particulate filter coupled in the engine exhaust; and
   a computer storage medium having a computer program encoded therein for determining degradation of said exhaust pressure sensor, comprising:
   code for determining at least a parameter based on at least two flow conditions;
   code for measuring a signal from the exhaust pressure sensor; and
   code for determining degradation of the exhaust pressure sensor based at least on said parameter and said signal.

2. The system of claim 1 wherein said engine is a diesel engine.

3. The system of claim 1 wherein said pressure sensor is a differential pressure sensor measuring differential pressure across said particulate filter.

4. The system of claim 1 wherein said pressure sensor is an absolute pressure sensor coupled downstream of said particulate filter.

5. The system of claim 1 wherein said particulate filter is coupled to an oxidation catalyst.

6. The system of claim 1 wherein said particulate filter is coupled to a NOx adsorber.

7. A method for monitoring a pressure sensor, the sensor responding to both an amount of exhaust gas flow and accumulation of sort in a particulate filer, the method comprising:

measuring a signal from the pressure sensor at least during two substantially different flow conditions where variation of the amount of exhaust gas flow between said two conditions is greater than a first amount while accumulation of soot is less than a second amount; and determining degradation of the sensor based on said signal and a reference.

8. The method of claim 7 wherein said first amount and second amounts are substantially the same.

9. The method of claim 7 wherein said first amount and second amounts are substantially different.

10. The method of claim 7 wherein said response is an expected signal response of the sensor during said condition.

11. The method of claim 10 wherein said determining said expected response of the sensor during said condition includes determining said expected response of the sensor during said condition based on said variation of said first parameter.

12. A method for monitoring a pressure sensor in an engine exhaust, the method comprising:

measuring a signal from the pressure sensor during at least a first and second flow condition wherein said first and second flow condition include a high floe and a low flow condition said measuring occurring while soot buildup is less than a selected amount;

determining an expected response of the sensor during said flow conditions; and determining degradation of the sensor when said signal differs by an amount from said expected response.

13. The method of claim 12 wherein said first and second flow condition include an idle and a non-idle condition.

14. The method of claim 10 wherein said sensor measures differential pressure across a particulate filter.

15. The method of claim 12 wherein said engine is a diesel engine.

16. The method of claim 12 wherein said expected response includes an expected response from varying flow conditions on a scale that is faster than a time scale of changes in flow restriction.

17. A system for a vehicle having an engine with an exhaust system, the system comprising:

a pressure sensor coupled in the engine exhaust;

a particulate filter coupled in the engine exhaust; and a computer storage medium having a computer program encoded therein for determining degradation of said exhaust pressure sensor, comprising:

code for determining an expected sensor response;

code for measuring a signal response from the exhaust pressure sensor during at least a selected engine operating condition; and code for determining degradation of the exhaust pressure sensor based at least on said expected sensor response and said signal response.

18. The system recited in claim 17 wherein said expected sensor response is determined when the engine is off.

19. The system recited in claim 17 wherein said expected sensor response is determined when the engine is operating.

20. The system recited in claim 12 wherein said code for determining an expected sensor response is enabled when exhaust flow is greater than a threshold value.

21. A system for a vehicle having an engine with an exhaust system, the system comprising:

a particulate filter coupled in the engine exhaust;

a sensor coupled in the engine exhaust; and a computer storage medium having a computer program encoded therein, comprising:

code for regenerating said particulate filter based on said sensor; and code for determining degradation of said sensor based on an operating parameter.

22. The system of claim 21 wherein said sensor is a differential pressure sensor.

23. The system of claim 21 wherein said sensor is a temperature sensor.

24. A system for a vehicle having an engine with an exhaust system, the system comprising:

a sensor coupled in the engine exhaust so that the sensor is exposed to the exhaust;

a particulate filter coupled in the engine exhaust with the sensor; and a computer storage medium having a computer program encoded therein for determining degradation of said sensor, comprising:

code for determining at least an operating parameter of the sensor based on at least two flow conditions of the exhaust;

code for measuring a signal from the sensor over time; and code for determining degradation of the sensor over time based at least on said parameter and said signal.

25. The system of claim 24 wherein said sensor determination of degradation commences based on an indication of steady flow conditions.

26. The system of claim 24 wherein said sensor determination of degradation commences based on an indication the exhaust system temperature is above a limit value.

* * * * *